Figure 1:
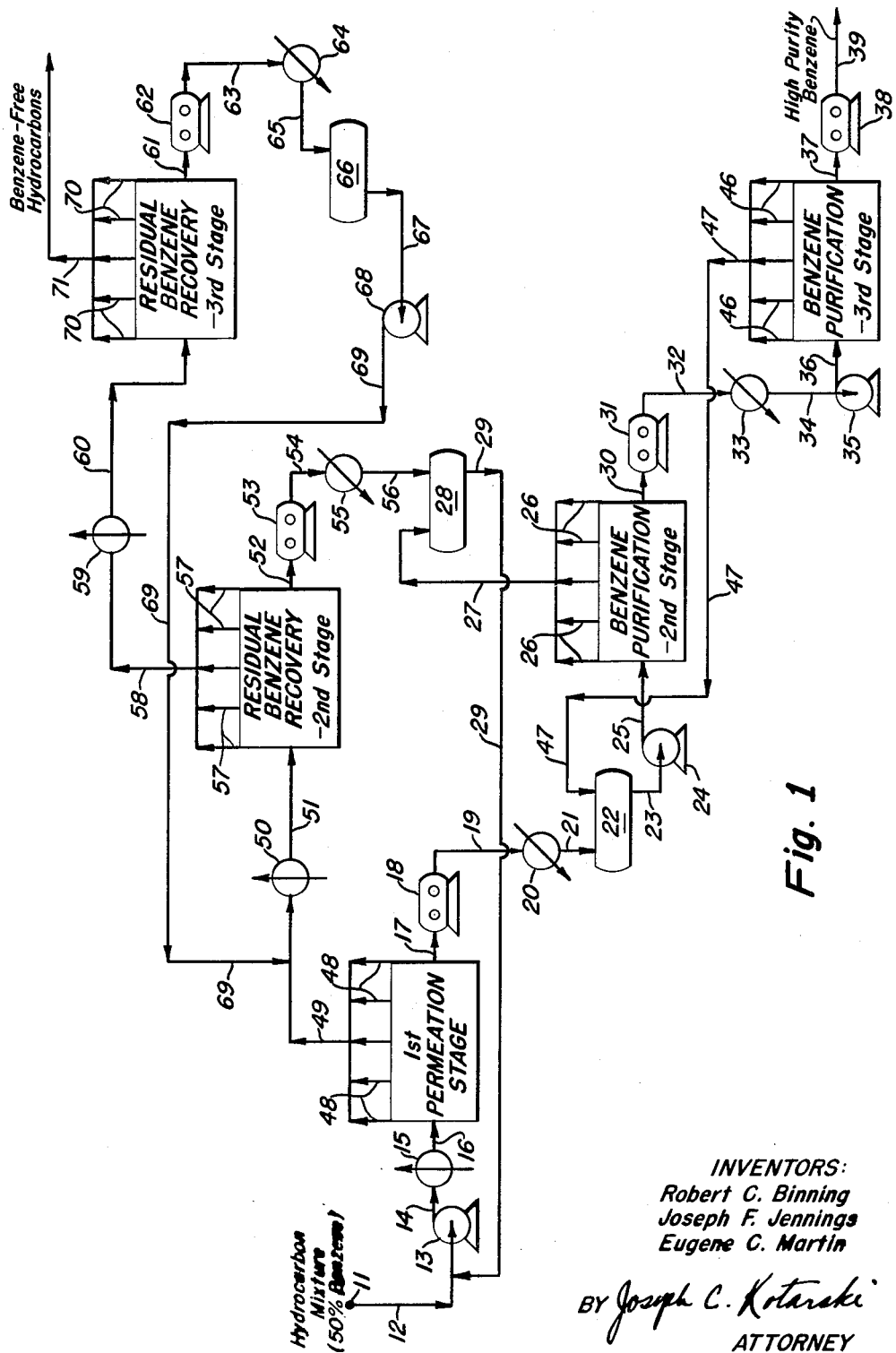

INVENTORS:
Robert C. Binning
Joseph F. Jennings
Eugene C. Martin

BY Joseph C. Kotarski

ATTORNEY

2,985,588

SEPARATION TECHNIQUE THROUGH A PERMEATION MEMBRANE

Robert C. Binning, Joseph F. Jennings, and Eugene C. Martin, Texas City, Tex., assignors, by mesne assignments, to Standard Oil Company, Chicago, Ill., a corporation of Indiana Filed Mar. 28, 1957, Ser. No. 649,110

8 Claims. (Cl. 210—23)

This invention relates to a method for separating liquid mixtures of molecules and it particularly concerns improvements in a permeation process for effecting such separations.

While the separation of mixtures of different molecules has heretofore been effected by employing permeation processes, the prior art leaves much to be desired from the standpoint of developing this technique from a laboratory curiosity to a practicable commercial operation. Numerous disadvantages such as low permeation rates, poor and changing selectivity in the separation, and unsteady operation have hindered development of the process. In addition to these problems, major difficulties arise in starting up and shutting down the permeation process which cause ruptured permeation membranes and/or loss of selectivity of the membrane for permeating one of the components of the mixture to be separated in preference to other components of the mixture. Thus a method which provides trouble-free startup and shutdown techniques and enables operation of the permeaiton process at high rates of permeation and with good selectivity is vital to the design of a commercial process.

An object of this invention is to provide a technique for starting up a permeation process which enables operation of the permeation process at higher temperatures than heretofore believed possible without causing rupture of the membrane. Another object is to provide a startup method and a method for operating the permeation process which enables higher permeation rates and greater selectivity in separation than could be obtained previously. A further object is to provide a technique for terminating the permeation run which avoids reducing the selectivity of the membrane for subsequent runs and/or eliminates the likelihood of the same membrane to be ruptured when used in a subsequent run. An additional object is to provide a method for increasing the selectivity of the permeation membrane, particularly in situations where the selectivity has been reduced by faulty operation such as faulty shutdown techniques in previous permeation runs. Other objects and advantages of the invention will be more fully understood from the detailed description of the invention.

The present invention is in part based upon the discovery that many beneficial effects are obtained by carrying out the permeation process where the following conditions simultaneously occur: (1) the permeation temperature is maintained between the softening point transition temperature and not higher than 20° C. above the first order transition temperature displayed by the plastic membrane during its use in the permeation process; (2) the mixture of molecules in the feed zone is maintained in the liquid state; (3) the mixture of molecules in the permeate zone is maintained in the vapor state; and (4) the absolute pressure in the permeate zone is maintained at less than one-half (e.g. one-tenth) of the vapor pressure normally exerted by the mixture in the permeate zone. Among the benefits are a high rate of permeation and a high degree of selectivity. The use of permeation operating temperatures above or below the defined limits results in rupture of the permeation membrane and great reduction in permeation rates, respectively. By maintaining the absolute pressure in the permeate zone under the defined conditions, a great improvement in selectivity is noted.

In the operation of the permeation process, the permeation membrane frequently ruptures at the beginning of the run. This difficulty can be avoided and the permeation process operated at an even higher temperature than heretofore believed possible by special startup techniques. In starting up, the absolute pressure in the permeate zone is maintained at less than one-half the vapor pressure which is normally exerted by the permeated portion at the permeation operating temperature before the liquid feed mixture is allowed to contact the membrane at the permeation operating temperature. The liquid feed mixture is then allowed to come in contact with the membrane at a temperature above the softening point transition temperature but not higher than 20° C. above the first order transition temperature displayed by plastic membrane when in contact with the liquid mixture in the feed zone under permeation conditions. For example, the absolute pressure in the permeate zone can be reduced to about 5 to 50 mm. Hg abs. and thereafter the liquid feed mixture (at a temperature between the softening point transition temperature and not higher than 20° C. above the first order transition temperature displayed by the membrane when in contact with the liquid feed) is introduced into the feed zone. Alternatively, the permeation process can be started up with the liquid feed mixture in contact with the membrane at a temperature below the softening point transition temperature of the membrane, followed by reducing the absolute pressure in the permeate zone to less than one-half the vapor pressure of the permeated portion at the temperature of operation, and then increasing the permeation operating temperature to above the softening point transition temperature but not more than 20° C. above the first order transition temperature of the membrane.

The permeation process is terminated by reducing the operating temperature to below the first order transition temperature (preferably below the softening point transition temperature of the membrane) and thereafter increasing the absolute pressure in the permeate zone to above one-half the vapor pressure exerted by the permeated portion but not above the pressure on the charge side of the membrane, e.g. increasing the pressure up to atmospheric when the charge is at atmospheric pressure or above. By using this shutdown technique, the selectivity of the membrane is not reduced, i.e. the permeation unit can be put on stream again and the membrane will have the same degree of selectivity; and the chances of rupturing the membrane when the permeation run is started up again is almost negligible.

The selectivity of the permeation membrane (for permeating one molecule more rapidly than other molecules contained in the mixture) can be increased by certain techniques. For example when a permeation run is shut down in a manner not in accordance with the techniques set forth above, the selectivity of the membrane is frequently reduced. Before starting another run to separate the same feed mixture, it is possible to regenerate a substantial part of the membrane's lost selectivity by carrying out a permeation run (using a liquid feed and maintaining the permeated portion in the vapor state while employing operating temperatures above the softening point transition temperature and not higher than 20° C. above the first order transition temperature displayed by the membrane when in contact with the liquid feed) in which the feed is only that most rapidly permeating component of the feed mixture which is to be subsequently separated. The permeation with this particular feed is carried out for a time sufficient to result in the desired increase in selectivity.

Figure 2:
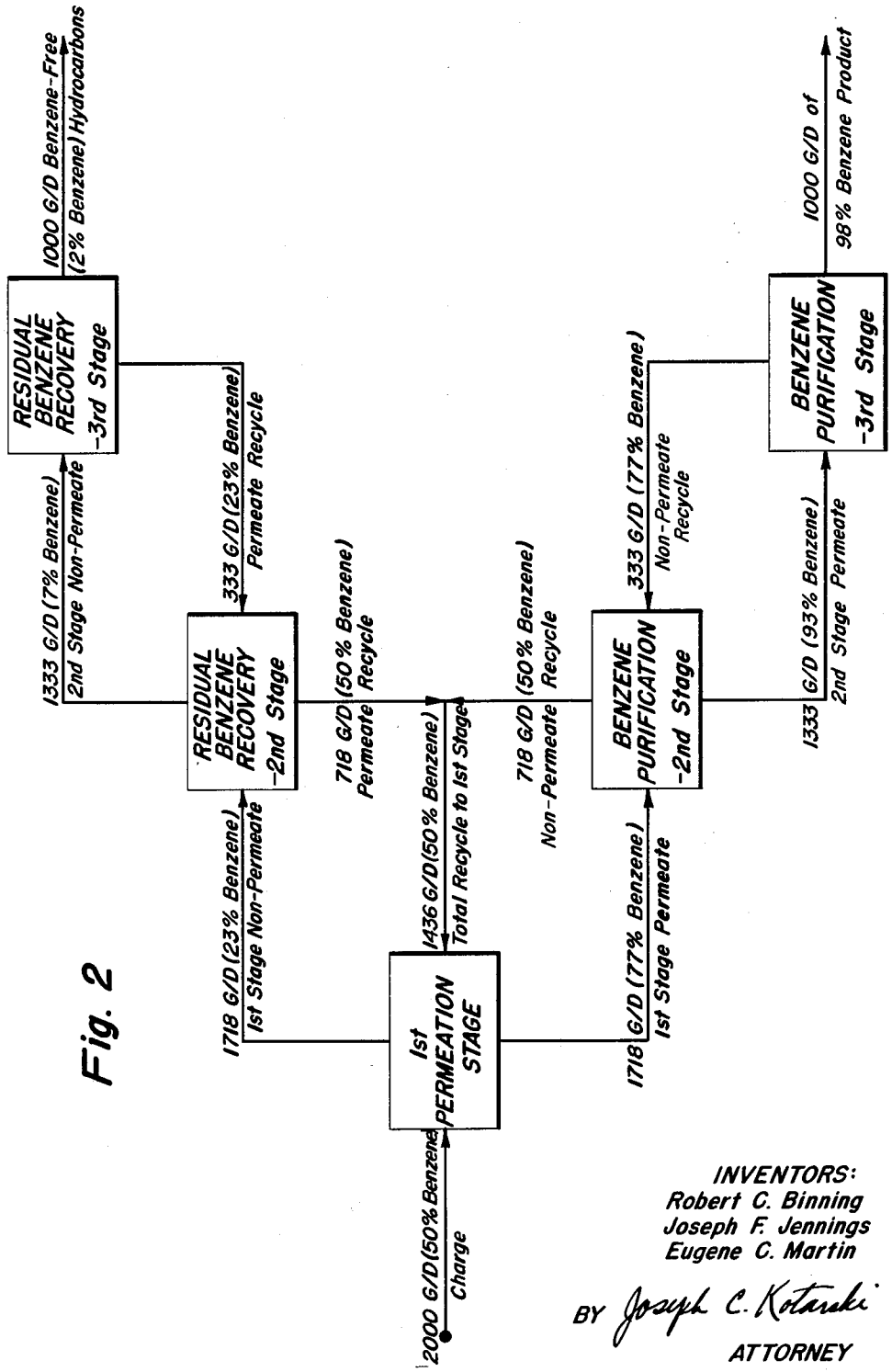
Figure 3:
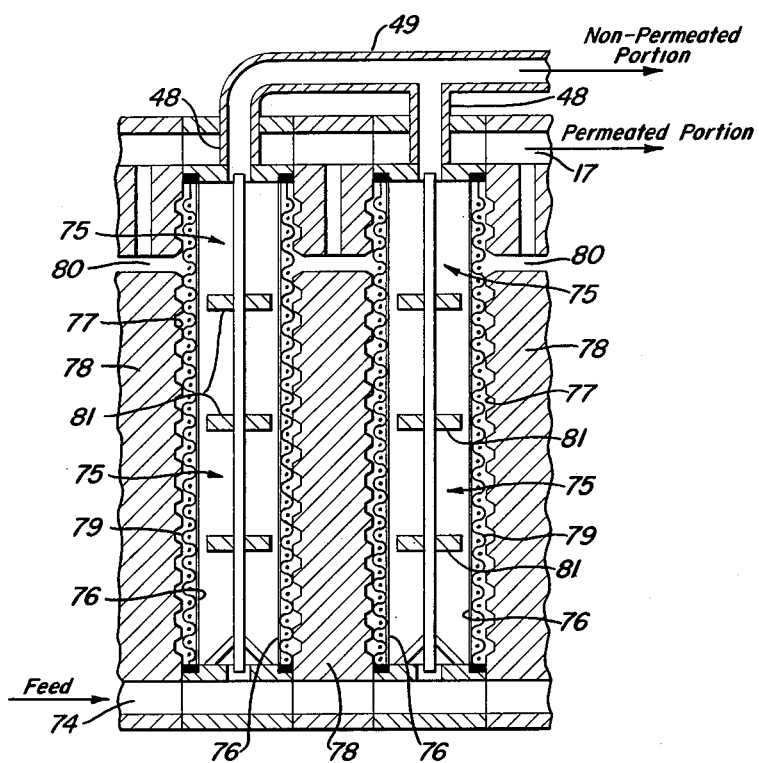

The invention will be more readily understood from the following detailed description of an example thereof read in conjunction with the accompanying drawings which form a part of this specification. Figure 1 shows in schematic form a simplified process design for carrying out the separation of high purity benzene from a hydrocarbon mixture containing about 50 percent benzene. For the sake of clarity many minor equipment items, such as would be apparent to one skilled in this art, have been omitted from the design. Figure 2 sets out in detail the composition and amounts of the various hydrocarbon streams which exist in carrying out the process shown in Figure 1. Figure 3 is a cross sectional view of a portion of the permeation apparatus such as may be employed in the permeation process of this invention.

Referring now to Figure 1, a benzene fraction containing about 50 percent benzene with the remainder being close boiling hydrocarbons such as methyl cyclopentane, cyclohexane, isoheptanes, etc. (such as might be obtained by the close fractionation of a virgin petroleum naphtha, cracked naphtha, or a catalytically reformed naphtha) is passed from source 11 by way of line 12 to pump 13 and then by way of line 14 to heater 15. The liquid is removed from the heater 15 at a pressure of about 5 p.s.i.g. and a temperature of 90° C. and then passed by way of line 16 into the first permeation stage. The liquid feed to each subsequent permeation stage is under a pressure of 5 p.s.i.g. or higher.

Before any of the liquid mixture is introduced into the first permeation stage, the pumping system connected to the permeate zones of the various permeation stages is activated. Thus the permeate zones in the first permeation stage are evacuated through the permeate exit lines which are connected to permeate manifolding line 17 and then to evacuator-compressor means 18. An absolute pressure of about 50 mm. Hg is initiated and maintained in the permeate zones of the first and all subsequent permeation stages. Evacuator-compressor 18 is connected by way of line 19 to condenser 20 wherein the permeate is liquified. The compressor section of evacuator-compressor 18 compresses the permeate vapors to a pressure such that they liquify at the permeation operating temperatures to be employed in the next permeation stage. The evacuator-compressor means and condensers associated with the subsequent permeation stages are also activated, thereby maintaining a pressure in the permeate zones of the subsequent permeation stages of about 50 mm. Hg abs. It is to be understood that startup techniques wherein the liquid mixture to be separated is contacted with the membrane prior to reducing the pressure in the permeate zone can be employed. However, it is absolutely essential that the temperature of the liquid mixture contacting the membrane be below the permeation operating temperature (and preferably below the softening point transition temperature of the membrane) if the absolute pressure in the permeate zone has not yet been reduced to less than one-half the vapor pressure exerted by the permeated portion at the permeation operating temperature. For example, alternate startup techniques in which the liquid mixture is introduced into the feed zone at a temperature below the softening point transition temperature of the membrane, followed by reducing the absolute pressure in the permeate zone to that defined, and then increasing the temperature to the permeation operating temperature, can be used.

The startup techniques described above have been found to be essential in order to operate the permeation process, while using a liquid feed mixture and employing the defined permeation temperatures, at high permeation rates without rupturing the membrane during start up of the run. The feed mixture to be separated must be contacted while in the liquid state with the permeation membrane in order to obtain the higher permeation rates resulting therefrom. Maintaining the feed mixture in the liquid state during the permeation run enables permeation rates more than 50 percent greater than if the feed were maintained in the vapor state when contacted with the membrane. Startup techniques other than those described by this invention cause rupturing of the membrane. For instance if the permeation process is started up by introducing the feed mixture in the liquid state into the feed zone where it contacts the membrane at a temperature above the softening point transition temperature and especially near the first order transition temperature of the plastic membrane (without previously having reduced the pressure in the permeate zone), and thereafter the pressure in the permeate zone is reduced to bring the permeation process on stream, the membrane will either have a reduced selectivity or it will rupture. Numerous startup tests have substantiated this.

*Example 1*

A liquid mixture of 55 vol. percent acetone–45 vol. percent carbon disulfide was charged to the feed zone of a permeation apparatus employing a cellulose triacetate membrane. The feed mixture was at 23° C. and the pressure in the permeate zone was 760 mm. Hg abs. As the pressure was reduced in the permeate zone to start up the permeation run, the membrane ruptured immediately.

*Example 2*

The permeation startup technique of Example 1 was repeated except that a pressure of about 40 mm. Hg abs. was maintained in the permeate zone prior to the time that the feed mixture was introduced into the feed zone of the permeation apparatus. Satisfactory startup and continued operation of the permeation process occurred. In fact the permeation temperature was raised to 40° C. and satisfactory operation occurred at this higher temperature. This results in permeation rates more than twice as great as would occur at the lower temperature of 23° C. used in Example 1. Thus this startup technique not only prevents rupturing of the membrane but it also permits operation at higher temperatures with consequent higher permeation rates than heretofore believed possible.

The permeation run is carried out while maintaining an operating temperature between the softening point transition temperature and not higher than 20° C. above the first order transition temperature of the membrane. Transition temperatures are recognized in the pior art as being the temperatures at which plastic materials undergo some change in state which affects decisively certain properties of the plastic such as modulus of elasticity, thermal conductivity, or electrical resistivity, etc. The softening point transition temperature (frequently coincides with second order or glass transition temperature) occurs at a lower temperature than does the first order transition temperature. The second order (softening point) and first order transition temperatures, although frequently referred to as being fixed and also being independent of the surrounding atmosphere, are in fact greatly affected by the atmosphere in which the plastic material is placed. In general, these transition temperatures are lowered when the plastic is immersed in the liquid feed mixture which is to be separated by permeation. It is to be understood that whenever the terms "softening point transition temperature," "second order transition temperature," and "first order transition temperature" are used they refer to these temperatures displayed by the plastic membrane when the plastic membrane is in contact with the liquid mixture with which it will be in contact during the permeation process. While the transition temperatures change depending upon the particular mixture in which the plastic is immersed, they are important factors in the operation of the permeation process. This is because a permeation run which is carried out at a temperature above the softening point transition temperature of the membrane results in higher permeation rates, presumably due to the fact that the molecular segments of the membrane are more mobile and permit more rapid movement of the permeating molecules therethrough. However, the permeation operating temperature should not be more than 20° C. higher than the first order transition temperature of the plastic membrane because at higher temperatures it is theorized that the molecular structure of the plastic material becomes so activated that it is readily disintegrated or ruptured. If the defined startup technique of this invention were not employed, it would not be possible to operate at a temperature even as high as the first order transition temperature. By using the startup technique of this invention, temperatures up to 20° C. in excess of the first order transition temperature of the membrane can be used. This points up the interdependence of the startup technique and the carrying out of the permeation run.

A relatively easy method for determining the softening point transition temperature and the first order transition temperature of any membrane will now be described. A sample of the membrane approximately one mil in thickness, 0.5 inch in width, and approximately 1½ inches in length has clamps approximately one-half inch in size attached to the opposite long ends of the membrane sample. The clamps are attached so as to leave a length of membrane sample approximately one inch long exposed between the two clamps. A weight is attached to the clamp at the lower end of the sample so that the added weight plus the weight of the clamp equal one gram. A sample (at room temperature) of the feed mixture to be permeated is placed in a graduated cylinder or other container provided with a linear scale and a transparent observation window. The sample of the membrane is then suspended from its non-weighted end within the graduated cylinder, so that the membrane sample is totally immersed in the liquid feed mixture. The mixture is then heated at a rate of about 1° C. per minute and the amount of elongation is read directly from the linear scale. The elongation is then plotted against temperature, for example, elongation being plotted as the abscissa and temperature plotted as the ordinate. From numerous plots of elongation versus temperature, it is noted that an almost direct relationship exists between elongation and temperature until the softening point transition temperature of the membrane is reached. Thus the line connecting the points plotting elongation at the various temperatures is essentially a straight line until the softening point transition temperature is reached. With certain membrane compositions and certain feed stock mixtures there is essentially no change in elongation with increase in temperature below the softening point transition temperature of the membrane, whereas with other membrane compositions or feed mixtures there is a gradual but essentially straight line increase in elongation with increase in temperature. The softening point transition temperature is reached before elongation exceeds about 20 percent (usually 10 percent or less). When the softening point transition temperature is reached, there is an abrupt change in the direction of the line which connects the points plotting elongation at higher temperatures. Frequently this line above the softening point transition temperature is curved and reflects increasingly greater changes in elongation as the temperature is increased. As the temperature is increased even further above the softening point transition temperature, the elongation increases until the membrane tears or otherwise disintegrates (usually after elongation of approximately 75–150 percent has been attained). The temperature at which the membrane sample tears is designated herein as the first order transition temperature. Whenever the terms softening point transition temperature and first order transition temperature are referred to herein, it is to be understood that such temperatures are those measured in accordance with the test procedure described in the preceding tests.

The permeation run is carried out while maintaining the permeate zone at an absolute pressure which is less than about one-half, e.g. one-tenth, of the vapor pressure which the permeated portion normally exerts under the permeation operating temperature. As an example, when the pressure in the feed zone is atmospheric pressure or higher, the absolute pressure in the permeate zone may suitably be between 5 and 50 mm. Hg abs. If the pressure in the feed zone is, for example 50 p.s.i.g., then the pressure in the permeate zone may be atmospheric pressure. By employing such conditions of reduced absolute pressure in the permeate zone, it is possible to obtain increases in the selectivity of the permeation process of as much as 50 percent or more while still maintaining the same permeation rates. Selectivity is extremely important in the permeation process, for minor increases in selectivity may reduce the number of stages required in the permeation process and hence cause an astounding reduction in capital investment. Many tests using many different feed stocks and many different plastic membranes verified the beneficial importance of employing the defined reduced pressures in the permeate zone. The following examples illustrate this:

*Example 3*

A feed stock containing 39% methanol and 61% benzene was charged in the liquid state at 59° C. to a permeation apparatus using an irradiated polyethylene membrane. The permeate was removed in the vapor state from the permeate zone. When the pressure in the permeate zone was held at 200 mm. Hg abs. (as contrasted with the ideal vapor pressure of 445 mm. Hg abs. which normally would be exerted by the permeating portion) the permeated portion consisted of 88% benzene and 12% methanol.

*Example 4*

When the same permeation experiment was carried out except that the absolute pressure in the permeate zone was approximately 0.1, i.e. 10 percent of the ideal vapor pressure that normally would be exerted by the permeated portion, the composition of the permeated portion was 91 percent benzene and 9 percent methanol. In this experiment the absolute pressure in the permeate zone was maintained at about 40 mm. Hg abs., whereas the ideal vapor pressure which normally would be exerted by the permeated portion was 435 mm. Hg abs.

*Example 5*

The experiment described in Example 3 was repeated except that the absolute pressure maintained in the permeate zone was equal to the ideal vapor pressure exerted by the permeated portion. In this run the pressure in the permeate zone was about 505 mm. Hg abs. and the ideal vapor pressure exerted by the permeated portion at the operating temperature was 505 mm. Hg abs. The composition of the permeated portion was 67 percent benzene and 33 percent methanol.

It is apparent from a comparison of Examples 3 and 4 with Example 5, that the selectivity of the permeation process can be tremendously increased. Various other membrane compositions and various other molecular mixtures were permeated therethrough and similar advantages were noted when the defined low absolute pressures in the permeate zone were employed. For instance when the same feed stock as used in Examples 3–5 was permeated through a cellulose triacetate membrane at an absolute pressure in the permeate zone equal to the vapor pressure normally exerted by the permeating mixture, the composition of the permeating mixture was 45 percent methanol and 55 percent benzene. When the absolute pressure in the permeate zone was about 0.1 the vapor pressure normally exerted by the permeating mixture, the concentration of methanol in the permeate was increased to 65 percent methanol, an increase of 50 percent.

Referring again to Figure 1, a portion of the feed mixture is permeated through the plastic membrane which separates the feed zone from the permeate zone. Herein, a cellulose acetate butyrate membrane (AB–504–40) having an acetyl content of 7.4 percent by weight, a butyryl content of 37.1 percent by weight, and a free hydroxyl content of 7.3 percent by weight and being 0.5 mil in thickness is used in all of the permeation stages. The permeated portion is withdrawn from the first permeation stage as a vapor. The vapors pass by way of line 17, through evacuator-compressor 18, then by way of line 19 to condenser 20 in which they are condensed to a liquid. The liquid is then passed by way of line 21 to accumulator 22 and thence by line 23 to pump 24. The permeated portion constitutes about 50 percent of the feed mixture introduced into the first permeation stage. The permeate from this permeation stage has a composition of approximately 77 percent benzene and 23 percent heptanes, cyclohexane, etc. The liquid mixture is passed through pump 24 by way of line 25 into the second permeation stage in which the benzene is further concentrated. The liquid feed mixture is at a somewhat lower temperature (for example, about 65–70° C.) in this permeation stage because the softening point and first order transition temperatures of the membrane when employed in the permeation process are lower, due to the higher concentration of benzene in the liquid feed to the second stage than existed in the first permeation stage. Except for the temperature, the operation of the second and third permeation stages for benzene purification are essentially the same as the operation of the first permeation stage as was described previously.

The non-permeated portion, which may comprise about 35 percent of the feed introduced by way of line 25, is removed from the second permeation stage by way of lines 26 and then passed into manifolding line 27. This non-permeated portion is a liquid and has a composition comprising about 50 percent benzene and 50 percent heptanes, cyclohexane, etc. Since it has a composition approximating the composition of the original feed mixture, it is passed by way of line 27 into accumulator 28 from which it is returned by way of line 29 to line 12 and subsequently introduced into the first permeation stage.

The permeated portion, which comprises about 65 percent of the feed introduced by line 25 in the second permeation stage for benzene purification, consists of about 93 percent benzene and 7 percent heptanes, cyclohexane, etc. The vapors of the permeated portion from the second permeation stage for benzene purification are withdrawn by way of line 30 through evacuator-compressor 31. The compressed vapors are then passed by way of line 32 into condenser 33 wherein they are liquified. The liquid is then passed through line 34, through pump 35, and then by way of line 36 into the third permeation stage for benzene purification. Because of the higher concentration of benzene in this mixture, the third permeation stage for benzene purification is operated at a lower temperature (for example, at about 45–50° C.) than the second permeation stage for benzene purification.

The non-permeated portion, which may comprise about 25 percent of the feed introduced by way of line 36, is removed from the third permeation stage for benzene purification by way of lines 46 and then passed into manifolding line 47. This non-permeated portion is a liquid and has a composition comprising about 77 percent benzene and 23 percent heptanes, cyclohexane, etc. Since it has a composition approximating the composition of the feed mixture to the second permeation stage for benzene purification, it is passed by way of line 47 into accumulator 22 from which it is returned along with the permeate from the first permeation stage to the second permeation stage for benzene purification.

The permeated portion, which comprises about 75 percent of the feed introduced by line 36 into the third permeation stage for benzene purification, is almost pure (98–99% purity) benzene. It is removed as a vapor from the permeate zone by way of line 37 through evacuator-compressor 38 and then passed by line 39 to means for liquifying and storing the benzene, which means are not shown herein.

Referring now to the first permeation stage, the liquid non-permeated portion withdrawn therefrom by way of lines 48 is passed into manifolding line 49. This non-permeated portion, which comprises about 50 percent of the original feed mixture has a composition of about 23 percent benzene, the remainder being heptanes, cyclohexane, etc. It is passed from manifolding line 49 as a liquid into heater 50. It is heated therein to a temperature of about 110° C., which is somewhat higher than the 90° C. at which permeation was carried out in the first permeation stage. The higher temperature, with its consequent higher permeation rate, is permissible because the softening point and first order transition temperatures of the membrane are higher due to the lower benzene concentration in the liquid mixture which is in contact with the permeation membranes. The heated liquid is removed from heater 50 and passed by way of line 51 into the second permeation stage for the recovery of residual amounts of benzene. This permeation stage is conducted essentially in the same manner as has been described for the operation of the other permeation stages except for the permeation temperature.

The permeated portion (which amounts to about 35 percent of the liquid charged by way of line 51) is removed from the permeate zone by way of line 52 as a vaporous composition containing about 50 percent benzene and 50 percent heptanes, cyclohexane, etc. The permeated portion in line 52 is drawn through evacuator-compressor 53 (which maintains an absolute pressure of 50 mm. Hg in the permeate zone), the compressed vapors being passed by way of line 54 to condenser 55 wherein they are condensed to a liquid. The liquid is passed by way of line 56 into accumulator 28 from which it is returned to the first permeation stage by way of line 29. Recycling is carried out since the composition of this stream approximates the composition of the original feed mixture.

The liquid non-permeated portion, which comprises about 65 percent of the feed introduced to the second permeation stage for residual benzene recovery, has a composition of about 7.5 percent benzene and 92.5 percent heptanes, cyclohexane, etc. It is passed by way of lines 57 as a liquid to manifolding line 58 and thence into heater 59. It is heated therein to a temperature of about 120° C. which is somewhat higher than the 110° C. at which permeation was carried out in the second permeation stage for residual benzene recovery. The higher temperature, with its consequent higher permeation rate, is permissible because the softening point and first order transition temperatures of the membrane are higher due to the lower benzene concentration in the liquid mixture which is in contact with the permeation membranes. The heated liquid is removed from the heater 59 and passed by way of line 60 into the third permeation stage for the recovery of residual amounts of benzene. This permeation stage is conducted essentially in the same manner as has been described for the operation of the other permeation stages.

The permeated portion (which amounts to about 25 percent of the liquid charged by the way of line 60) is removed from the permeate zone by way of line 61 as a vaporous composition containing about 23 percent benzene and 77 percent heptanes, cyclohexane, etc. The permeated portion in line 61 is passed through evacuator-compressor 62 and the compressed vapors passed by way of line 63 to condenser 64 wherein they are condensed to a liquid which flows by way of line 65 into accumulator 66. This liquid is then passed by way of line 67 through pump 68 and line 69 and then to line 49 for return to the second permeation stage for recovery of residual benzene. Recycling is carried out since the composition of this stream approximates the composition of the feed to the second permeation stage for recovery of residual benzene.

The liquid non-permeated portion is withdrawn from the third permeation stage for residual benzene recovery by way of lines 70 and passed to manifolding line 71. Manifolding line 71 collects all of the non-permeated portion and passes it to storage means not shown. This non-permeated portion withdrawn by line 71 comprises about 75 percent of the feed introduced by way of line 60 into the third permeation stage for residual benzene recovery. It contains only about 1–2 percent benzene, the remainder being close boiling hydrocarbons such as n-hexane, methyl cyclopentane, cyclohexane, various isomers of heptane, etc.

Figure 2 is a schematic flow diagram which shows the amounts and compositions of the various permeated and non-permeated streams flowing through the different permeation stages in the embodiment described in Figure 1. A charge of 2,000 gallons/day containing 50 percent benzene along with associated close boiling hydrocarbons such as n-hexane, methyl cyclopentane, cyclohexane, isoheptanes, etc. is employed as the initial stock to be separated. 1,000 gallons/day of benzene product of 98–99 percent purity is recovered. Another stream of 1,000 gallons/day of essentially benzene-free hydrocarbons (containing about 1–2 percent benzene) and consisting of the hydrocarbons including n-hexane, methyl cyclopentane, cyclohexane, isoheptanes, etc. is also recovered.

A cross sectional view of a portion of the permeation apparatus such as is used in the first and subsequent permeation stages is shown in Figure 3. The feed inlet is indicated by passageway 74. This passageway serves as a manifolding which allows the liquid feed mixture to enter the various individual feed zones designated by 75. As the liquid feed mixture enters the various feed zones it comes in contact with plastic membrane 76 and the molecules in the feed mixture which are more soluble in the membrane permeate therethrough more rapidly than those molecules which are less soluble in the permeation membrane. Thus a portion of the feed mixture permeates through the membrane and passes along griddle-design grooves 77 (permeate zone) in the membrane backing plate 78. The membranes are supported away from backing plate 78 by screen 79. The grooves 77 in the surface of membrane backing plate 78 ultimately lead to a withdrawal passageway 80 in the interior of membrane backing plate 78. This withdrawal passageway 80 then connects with permeate manifolding line 17 by which the permeated portions of the feed mixture are withdrawn from the particular permeation stage. The feed mixture in feed zones 75 progresses upwardly through the feed zones, portions of the introduced liquid permeating through plastic membranes 76 as it progresses upwardly, and the remaining amount of the mixture withdrawn from feed zones 75 is termed the non-permeated portion. The non-permeated portion is withdrawn from the top of feed zones 75 by way of lines 48 which connect with manifolding line 49. Manifolding line 49 combines the individual non-permeated portions in the particular permeation stage. Stationary baffles 81 are positioned within feed zones 75 to prevent differences in composition of the mixture between the zone immediately adjacent the membrane and points nearer the center of feed zones 75. Because plastic membrane 76 which separates feed zones 75 from permeate zones 77 is tightly sealed, no portion of the feed mixture can pass from the feed zones into the permeate zones except by permeating through plastic membrane 76.

In beginning the shutdown of the permeation process, the temperatures of the feed mixtures to the various permeation stages are reduced. The mixtures are not heated to the softening point transition temperature of the membranes with which the particular feed compositions come in contact. Thus the original feed mixture is not heated in heater 13 and the permeation run is continued at ambient temperatures, e.g. 20°–30° C. Likewise heaters 50 and 59 are shut-off and the non-permeated portion from the first and second permeation stages are not heated but are passed directly into the permeation stages which recover residual amounts of benzene. Condensers 20, 33, 55, and 64 are allowed to continue to operate until the temperatures of the various liquid streams thus reach approximately atmospheric temperatures. After the temperature of the liquid mixtures in contact with the membranes has been reduced to below the first order transition temperature and preferably below the softening point transition temperature (herein, the latter) of the membrane, the operation of evacuator-compressors 18, 31, 38, 53 and 62 is terminated. The permeation run is then at an end. Liquid feed is in contact with the plastic membrane in all of the various permeation zones. This prevents drying out of the plastic membrane which ordinarily causes quick rupture of the membranes in subsequent permeation runs. When it is desired to start up the permeation process to separate an additional batch of the mixture, evacuator-compressors 18, 31, 38, 53, and 62 can be started in operation. The startup operation is then repeated as was previously described.

The importance of employing the described shutdown technique was demonstrated in numerous tests. These tests showed that unless the temperature of the liquid feed mixture in contact with the permeation membrane is reduced to below the first order transition temperature of the membrane before allowing the pressure in the permeate zone to rise, the membrane will rupture very readily when the permeation process is put back on stream. If the temperature of the liquid mixture is reduced to below the first order transition temperature but is still above the softening point transition temperature when the pressure in the permeate zone is raised to atmospheric pressure, then the membrane will suffer a loss in selectivity and may rupture when brought on stream. Many tests have shown this. For example, a mixture of 25 vol. percent methyl ethyl ketone, 37.5 vol. percent n-heptane, and 37.5 vol. percent isooctane was charged in the liquid state to the feed zone of a permeation process. Permeation was carried out using a cellulose acetate-butyrate permeation membrane at a temperature of 70° C. while employing a pressure of 40 mm. Hg abs. in the permeate zone. The permeation run was carried out for a suitable length of time. Thereafter it was desired to terminate the run. The pressure in the permeate zone was allowed to rise to 760 mm. Hg abs. and permeation was discontinued. Approximately an hour later the unit was started up by first reducing the pressure in the permeate zone. As the pressure was reduced therein the membrane ruptured immediately. This same phenomenon was also observed to occur where the temperature is lowered 10 to 20° C. below the normal operating temperature but still above the softening point transition temperature of the plastic membrane. Tests showed, however, that when the permeation run was terminated by lowering the permeation temperature to below the softening point transition temperature of the membrane prior to raising the pressure in the permeate zone to atmospheric pressure and then allowing the liquid feed to contact the membrane for an extended time, the membrane did not rupture or suffer a loss in selectivity when the permeation unit was started up again. Because it is desirable to allow liquid to remain in the feed zone in contact with the membrane when the permeation run is shut down, in order to prevent drying out and cracking of the plastic membrane, this can be done in a practicable manner without having the membrane rupture in subsequent runs by using the described shutdown techniques of this invention.

As was indicated, termination of the permeation run by increasing the absolute pressure in the permeate zone prior to decreasing the permeation temperature will cause a reduction in selectivity of the permeation membrane when the liquid in the feed mixture is thereafter allowed to remain in contact with the membrane at temperatures above the softening point transition temperature of the membrane. The plastic membrane appears to undergo some reorientation of its molecules which causes this loss in selectivity. It has been found that the selectivity of the membrane can be increased and usually restored substantially to its original selectivity by carrying out a permeation run which appears to recondition the membrane, perhaps by reorienting its molecular structure. In the reconditioning process, a conventional permeation run as defined by this invention is carried out except that the feed mixture employed consists substantially only of that component of the mixture (which mixture is to be used as the feed mixture later) which permeates most rapidly. Thus the feed is maintained in the liquid phase and at a temperature above the softening point transition temperature while the permeate is removed as a vaporized product. It may be necessary to employ a somewhat lower temperature in this membrane reconditioning technique than is used in the permeation run on the feed mixture to be separated because the first order transition temperature of the membrane will be lower in contact with the pure component which permeates more rapidly than it is when in contact with the mixture which is to be separated later. The membrane reconditioning run is carried out for a length of time (usually 1 to 5 hours is satisfactory) sufficient to increase the selectivity and preferably to restore the selectivity of the membrane to substantially what it was originally. The loss in selectivity of the membrane by using improper techniques for shutting down the permeation run, and regeneration of the selectivity of the membrane by the previously described technique were demonstrated repeatedly in a number of runs. One of the tests demonstrating these phenomena is reproduced below as an example.

*Example 6*

A 50–50 mixture of n-heptane and isooctane was charged to the feed zone of the permeation apparatus which employed an ethyl cellulose membrane (G–100) having an ethoxyl content of about 45 percent by weight. A permeation temperature of 100° C. was used and the permeated portion was removed as a vapor from the permeate zone (permeate zone maintained at subatmospheric pressure). The composition of the initial permeate consisted of 78% n-heptane and 22% isooctane. Thereafter the permeation run was terminated by allowing the pressure in the permeate zone to increase to atmospheric pressure (by shutting off the vacuum pump connected to the permeate zone), and the hot mixture in the feed zone was allowed to remain in contact with the permeation membrane for 24 hours. The mixture in the feed zone was replaced with a fresh 50–50 mixture of n-heptane and isooctane and the permeation unit was started up by first reducing the pressure in the permeate zone and then heating the mixture in the feed zone to 100° C. The composition of the permeate initially recovered was 64% n-heptane and 36% isooctane. Thus the faulty shutdown resulted in a selectivity drop in the membrane of from 78% n-heptane in the permeate down to 64% n-heptane in the permeate.

Thereafter the mixture in the feed zone was removed and pure n-heptane was introduced into the feed zone. The permeation run was then started up again (in the manner stated immediately above) and permeation of the n-heptane was continued for about 225 hours. The permeation run was then terminated, the n-heptane removed from the feed zone, and a fresh 50–50 mixture of n-heptane and isooctane was charged to the feed zone. The permeation unit was started up in the preceding manner described and it was found that the initial composition of the permeate was 74% n-heptane and 26% isooctane. The selectivities of the membrane in its different conditions is shown in the following table:

| Amount n-Heptane in Feed, percent | Condition of Membrane | Amount n-Heptane in Permeate, percent |
|---|---|---|
| 50 | New | 78 |
| 50 | After faulty shutdown | 64 |
| 50 | After regeneration of selectivity | 74 |

Thus by the membrane selectivity regeneration technique, the selectivity of the membrane was regenerated or restored to a point where the permeate contained 74% n-heptane as against 64% n-heptane in the run employing the membrane of degenerated selectivity. In addition, the membrane which had its selectivity regenerated also had a permeation rate which was about 8% greater than the original membrane.

The loss in selectivity of the membrane can also be avoided by an improvement in the shutdown technique. This particular improvement consists of discontinuing the flow of the mixture to be separated and substituting in its place the component of the feed mixture which permeates most rapidly. This component should be at a temperature lower than the second order transition temperature of the membrane. As this component passes through the permeation system, it cools down the entire system to below the second order transition temperature of the membrane and thereafter the pressure on the permeate zones can be increased. For example, in the process described in the attached figures, the flow of the feed mixture to the first permeation stage can be discontinued and cooled benzene at a temperature of about 10° C. or preferably lower can be introduced by line 16 into the first permeation stage. The cooled benzene passes, without subsequent reheating, into the later stages of the system and eventually can be recovered from the system by way of lines 39 and 71. After benzene is in all of the various feed zones and when the temperature through the system is at about 10° C., the pressure in the permeate zones can be restored to atmospheric by shutting down the evacuator-compressors associated therewith. At this point the entire system can be shut down and the plastic membrane is in complete contact with liquid benzene in the feed zones of the various permeation stages. Because it is in contact with the component of the mixture intended to be separated and which component permeates most rapidly, the selectivity of the membrane which remains in contact with the liquid benzene is not reduced. Thereafter when it is desired to start up the permeation process, the usual startup procedure can be used, the benzene which passes through the system first can be recovered, and thereafter the benzene feed mixture to be separated can be introduced into the permeation system by way of line 17.

From the description of the startup technique, the operating technique, and the shutdown technique, it is apparent that the aforementioned techniques are integrated with each other and so interrelated that when used together they provide a unitary permeation process which produces results heretofore unobtainable. Thus the particular startup technique enables the permeation run to be carried out at temperatures above the first order transition temperature of the membrane, and by operating at such temperatures while maintaining the defined reduced pressure in the permeate zone it is possible to obtain high permeation rates at increased selectivity. It is particularly essential to follow the defined shutdown techniques, when the permeation run is carried out in the defined manner, in order to prevent a loss in membrane selectivity or rupture of the membrane when the permeation run is started up again. If the selectivity of the membrane becomes reduced inadvertently by the use of improper shutdown techniques, etc. it may be restored to substantially its original selectivity by the regeneration technique defined.

While the invention has been described in terms of an embodiment in which a cellulose acetate butyrate membrane is employed and a mixture of benzene with close boiling hydrocarbons is processed to recover purified benzene, the particular membrane employed and the feed mixture separated are illustrative only and do not constitute an essential feature of the present invention. A wide variety of plastic membranes may be employed, and a wide variety of liquid or liquefiable mixtures of two of more components in molecular solution (as distinct from suspensions or colloidal solutions, e.g. aqueous sugar solutions, aqueous inorganic salt solutions, solutions of chlorophyl, etc. which are sometime separated by the process of dialysis in which the macromolecule, e.g. sugar is incapable of passing through a dialysis membrane) may be separated. Molecular solutions of oil soluble organic chemicals such as mixtures of carbon disulfide with acetone, benzene with methanol, hexanol with butyl sulfide, mixtures of hydrocarbons such as benzene with cyclohexane or various isomeric heptanes, various petroleum fractions such as naphthas which preferably boil over a narrow range, e.g. 20° C., etc., can be separated using plastic membranes such as the various cellulosic membranes, e.g. cellulose acetate-butyrate, cellulose propionate, ethyl cellulose, propyl cellulose, polyethylene, polystyrene, neoprene, or other membranes in which the oil soluble compounds are soluble and permeate therethrough. Mixtures of water soluble organic compounds or aqueous solutions of water soluble chemicals can be separated by permeation through various plastic membranes. For example, aqueous solutions of ethanol, pyridine, methyl ethyl ketone, formic acid, etc. can be permeated to separate the water therefrom while employing permeation membranes such as cellulose acetate, regenerated cellulose, polyacrylonitrile, etc. Various mixtures of oil soluble and water soluble organic compounds similarly can be separated by permeation through various plastic membranes such as ethyl cellulose, cellulose acetate-butyrate, regenerated cellulose, cellulose acetate, etc. Because the component which is more soluble in the membrane also permeates through the membrane more rapidly than the other components, the choice of the particular membrane to be used will determine whether the permeated portion is enriched in one component or a different component of the mixture undergoing separation.

Thus having described the invention what is claimed is:

1. A process for separating molecular solutions of liquid mixtures containing at least two different components, the molecules of which components have differing solubilities within a plastic membrane which separates a feed zone and a permeate zone of a permeation apparatus, which process comprises starting up the permeation by introducing the mixture into the feed zone of a permeation apparatus under conditions which prevent the membrane from rupturing or losing selectivity, maintaining the mixture in the liquid state therein, permeating a portion of the liquid mixture in the feed zone through the plastic membrane into the permeate zone, maintaining a permeation operating temperature which is above the softening point transition temperature displayed by the membrane when in contact with the liquid mixture in the feed zone but not higher than 20° C. above the first order transition temperature displayed by the membrane when in contact with the liquid mixture in the feed zone, maintaining the permeated portion in the vapor state within the permeate zone, maintaining the absolute pressure in the permeate zone at less than one-half the vapor pressure normally exerted by the permeated portion at the permeation operating temperature, and continuously removing from the permeate zone a vaporized permeated portion which is enriched in that component of the liquid mixture whose molecules are most soluble in the membrane.

2. The process of claim 1 wherein the absolute pressure maintained in the permeate zone is between 5 and 50 mm. Hg.

3. The process of claim 1 wherein said starting up of the permeation process comprises reducing the absolute pressure in the permeate zone to less than one-half the vapor pressure which the permeated portion normally exerts at the permeation operating temperature prior to contacting the liquid mixture in the feed zone with the plastic membrane at the permeation operating temperature.

4. The process of claim 1 wherein said starting up of the permeation process comprises reducing the absolute pressure in the permeate zone to less than one-half the vapor pressure which the permeated portion normally exerts at the permeation operating temperature prior to contacting the liquid mixture in the feed zone with the plastic membrane at a temperature which is above the softening point transition temperature displayed by the membrane when in contact with said liquid mixture.

5. In the process of claim 4, the method of starting up the permeation process which comprises the steps of (1) contacting the liquid mixture in the feed zone with the plastic membrane at a temperature below the softening point transition temperature which the membrane displays when in contact with said liquid mixture, (2) thereafter reducing the absolute pressure in the permeate zone to less than one-half the vapor pressure which the permeated portion normally exerts at the permeation operating temperature, (3) and then increasing the temperature of the liquid mixture in the feed zone to the permeation operating temperature which is above the softening point transition temperature displayed by the membrane when in contact with said liquid mixture.

6. The process of claim 1 which has the added steps of shutting down operation of the permeation process by the steps of (1) lowering the permeation operating temperature to a temperature below the softening point transition temperature displayed by the membrane when in contact with the liquid mixture in the feed zone, and (2) thereafter increasing the pressure in the permeate zone to at least atmospheric pressure but not to a higher pressure than exists in the feed zone.

7. The process of claim 1 which includes the preceding step of increasing the selectivity of the permeation membrane for separating molecular solutions of liquid mixtures containing at least two different components, which preceding step comprises introducing into the feed zone a regenerative feed consisting substantially entirely of that component of the given mixture whose molecules permeate through the membrane more rapidly than the molecules of other components of said given mixture, permeating the regenerative feed through the membrane into the permeate zone while employing a permeation operating temperature which is above the softening point transition temperature displayed by the membrane when in contact with the regenerative feed but not more than 20° C. above the first order transition temperature displayed by the membrane when in contact with said regenerative feed, maintaining the permeated portion in the permeate zone in the vapor state and continuously removing permeate vapors therefrom, carrying out said permeation until the selectivity of the permeation membrane has been increased.

8. In a permeation process for separating molecular solutions of liquid mixtures containing at least two different components in which process is employed a permeation apparatus comprised of a feed zone and a permeate zone which are separated from each other by a plastic membrane in which molecules of one component of the liquid mixture are more soluble than molecules of another component, the improvement which comprises the steps of: (1) starting up the permeation process by maintaining an absolute pressure in the permeate zone which is less than one-half the vapor pressure which the permeated portion normally exerts at the permeation operating temperature prior to contacting of the liquid mixture in the feed zone with the plastic membrane at the permeation operating temperature, thereafter contacting the liquid mixture with the plastic membrane at the permeation operating temperature, said permeation operating temperature being above the softening point transition temperature displayed by the membrane when in contact with the liquid mixture in the feed zone but not more than 20° C. above the first order transition temperature displayed by the membrane when in contact with the liquid mixture in the feed zone, (2) permeating a portion of the liquid mixture in the feed zone through the plastic membrane into the permeate zone while continuously removing from the permeate zone a vaporized permeated portion which is enriched in that component of the liquid mixture whose molecules are most soluble in the membrane, and (3) shutting down the permeation run by lowering the temperature of the liquid mixture in contact with the plastic membrane to below the softening point transition temperature displayed by the membrane when in contact with the liquid mixture in the feed zone, and subsequently increasing the pressure in the permeate zone to at least atmospheric pressure but not above the pressure which exists in the feed zone.

References Cited in the file of this patent

UNITED STATES PATENTS

| | | |
|---|---|---|
| 2,159,434 | Frey | May 23, 1939 |
| 2,386,826 | Wallach et al. | Oct. 16, 1945 |
| 2,436,317 | Manjoine | Feb. 17, 1948 |
| 2,475,990 | Robertson | July 12, 1949 |
| 2,518,217 | Beck | Aug. 8, 1950 |
| 2,729,967 | Kaufman | Jan. 10, 1956 |
| 2,768,751 | Booth | Oct. 30, 1956 |

OTHER REFERENCES

Science, July 13, 1956, vol. 124, No. 3211, pages 77–79.

Treybal: Liquid Extraction, McGraw-Hill, 1951, page 282.